(12) United States Patent
Tsuchiya et al.

(10) Patent No.: US 9,308,637 B2
(45) Date of Patent: Apr. 12, 2016

(54) POWER TOOL

(75) Inventors: Tadayoshi Tsuchiya, Aichi-ken (JP);
Takayoshi Yoshimura, Aichi-ken (JP);
Tomonobu Nashimoto, Aichi-ken (JP)

(73) Assignee: MAKITA CORPORATION, Aichi (JP)

( * ) Notice: Subject to any disclaimer, the term of this patent is extended or adjusted under 35 U.S.C. 154(b) by 648 days.

(21) Appl. No.: 13/580,270

(22) PCT Filed: Feb. 10, 2011

(86) PCT No.: PCT/JP2011/052939
§ 371 (c)(1),
(2), (4) Date: Aug. 21, 2012

(87) PCT Pub. No.: WO2011/105232
PCT Pub. Date: Sep. 1, 2011

(65) Prior Publication Data
US 2012/0317821 A1  Dec. 20, 2012

(30) Foreign Application Priority Data

Feb. 25, 2010  (JP) .................................. 2010-039733
Feb. 25, 2010  (JP) .................................. 2010-039734

(51) Int. Cl.
*A01G 3/053*  (2006.01)
*B25F 5/02*   (2006.01)

(52) U.S. Cl.
CPC .. *B25F 5/02* (2013.01); *A01G 3/053* (2013.01)

(58) Field of Classification Search
CPC .................................. A01G 3/053; B25F 5/02
See application file for complete search history.

(56) References Cited

U.S. PATENT DOCUMENTS

| 3,757,194 | A | 9/1973 | Weber et al. |
| 5,065,476 | A | 11/1991 | Dohse et al. |
| 5,150,523 | A | 9/1992 | McCurry |
| 7,159,322 | B2 | 1/2007 | Sasaki et al. |
| 2005/0115079 | A1 | 6/2005 | Sasaki et al. |
| 2007/0245575 | A1 | 10/2007 | Rosskamp |
| 2009/0241350 | A1* | 10/2009 | Lau ................................. 30/199 |

(Continued)

FOREIGN PATENT DOCUMENTS

| CN | 2826963 | 10/2006 |
| DE | 19532299 | 3/1997 |

(Continued)

OTHER PUBLICATIONS

Japan Office action, dated Oct. 16, 2012 along with an english translation thereof.

(Continued)

*Primary Examiner* — Stephen Choi
(74) *Attorney, Agent, or Firm* — Greenblum & Bernstein, P.L.C.

(57) ABSTRACT

A power tool is provided with a first unit, a second unit rotatable with respect to the first unit, a lock operation member and a lock cooperative switch. The lock operation member is configured to be operated by the user between a lock position and an unlock position, and configured to prevent rotation of the first and second units at the lock position and allow the rotation between the first and second units at the unlock position. The lock cooperative switch is disposed on the supply circuit of energy to the prime mover, and configured to enable the supply circuit when the lock operation member is at the lock position and cutoff the supply circuit when the lock operation member is at the unlock position.

18 Claims, 8 Drawing Sheets

(56) References Cited

U.S. PATENT DOCUMENTS

| | | | | |
|---|---|---|---|---|
| 2010/0199949 A1* | 8/2010 | Tamura et al. | ................ | 123/334 |
| 2010/0281697 A1* | 11/2010 | Tate et al. | ....................... | 30/312 |
| 2011/0203119 A1 | 8/2011 | Rosskamp | | |
| 2012/0031635 A1* | 2/2012 | Svennung et al. | .............. | 173/20 |

FOREIGN PATENT DOCUMENTS

| EP | 1212935 | 6/2002 |
|---|---|---|
| JP | 49-41138 | 4/1974 |
| JP | 3-117573 | 5/1991 |
| JP | 2997024 | 5/1991 |
| JP | 2002-171833 | 6/2002 |
| JP | 2005-160306 | 6/2005 |
| JP | 2006-101798 | 4/2006 |
| JP | 2007-275063 | 10/2007 |
| JP | 2009219425 A * | 10/2009 |

OTHER PUBLICATIONS

International Preliminary Report on Patentability for PCT/JP2011/052939, mailed Sep. 18, 2012.
WIPO International Search Report (ISR) dated May 10, 2011, with English language translation.
WIPO Written Opinion dated May 10, 2011.
Russian Office Action, dated Dec. 9, 2013 along with an English langauge translation thereof.
China Office action, dated May 23, 2013 along with an English language translation thereof.
European Search Report, Jan. 15, 2015.
Japan Office Action, dated Oct. 29, 2013 along with an English translation thereof.

* cited by examiner

POWER TOOL

TECHNICAL FIELD

The present teachings relates to a power tool, and more particularly to a power tool capable of changing a position and direction of a handle with respect to a tool.

BACKGROUND ART

JP 3-117573 A discloses a power tool capable of changing a direction of a handle with respect to a tool. In this type of power tool, a main body is provided with a first unit and a second unit capable of rotating with respect to the first unit. The first unit is provided with the tool attached thereto, and the second unit is provided with a handle gripped by a user. The user can adjust the position and direction of the handle with respect to the tool by rotating the second unit with respect to the first unit. DE 19532299 A1 discloses a power tool of the same type.

The power tool described above is further provided with a start operation member, a lock operation member, and an interlock mechanism. The start operation member is an operation switch that is operated by the user in order to activate the tool by a prime mover. The lock operation member is an operation switch that is operated by the user in order to release the lock between the first unit and the second unit. The interlock mechanism is for mechanically preventing operations of both the start operation member and the lock operation member. This structure prevents the lock between the first unit and the second unit from being released while the tool is activated by the prime mover, and prevents the tool from being activated by the prime mover while the lock between the first unit and the second unit is released.

SUMMARY OF INVENTION

Technical Problem

The power tool described above is capable of operating the start operation member and the lock operation member simultaneously in case of failure in the interlock mechanism. In this case, the user needs to adjust the position or direction of the handle while handling the start operation member carefully, which deteriorates the operability of the power tool.

In view of the problems described above, an object of the teachings disclosed in the present specification is to improve the operability of a power tool capable of adjusting the position or direction of a handle of the tool with respect to the tool.

Solution to Technical Problem

A power tool according to the present teachings is provided with a tool and a main body configured to activate the tool by a prime mover. The main body is provided with a first unit and a second unit rotatable with respect to the first unit. The first unit is configured to attach the tool. The second unit is provided with a handle to be gripped by a user. In this power tool, the position or direction of the handle with respect to the tool can be adjusted by rotating the second unit with respect to the first unit.

The power tool further is provided with a start operation member and a start cooperative switch. The start operation member is operated by the user between a start position and a stop position. The start cooperative switch is provided on a supply circuit for supplying energy to the prime mover. When the start operation member is at the start position, the start cooperative switch enables the supply circuit. When the start operation member is at the stop position, the start cooperative switch cuts off the supply circuit. Consequently, the prime mover activates and deactivates the tool in response to the operations performed on the start operation member.

The power tool is further provided with a lock operation member and a lock cooperative switch. The lock operation member is operated by the user between a lock position and an unlock position. When the lock operation member is at the lock position, the second unit is prevented from rotating with respect to the first unit. When the lock operation member is at the unlock position, the second unit is allowed to rotate with respect to the first unit. The lock cooperative switch is provided on the abovementioned supply circuit. When the lock operation member is at the lock position, the lock cooperative switch enables the supply circuit. When the lock operation member is at the unlock position, the lock cooperative switch cuts off the supply circuit.

According to this structure, the prime mover is prevented from being energized by the lock cooperative switch when the lock operation member is at the unlock position. For example, when the prime mover is a motor, electric power to be supplied to the motor is cut off. When the prime mover is an engine, fuel to be supplied to the engine is cut off. Therefore, while the lock operation member is at the unlock position, the activation of the tool by the prime mover is prevented even when the start operation member is operated to the start position.

When adjusting the position or direction of the handle with respect to the tool, the user often unintentionally applies operating force to the start operation member provided in the handle. As mentioned above, while the lock operation member is at the unlock position, the activation of the tool is prevented by the lock cooperative switch, regardless of the position of the start operation member. However, when the start operation member is operated to the start position, the tool is activated unintentionally by the prime mover, once the lock operation member is returned to the lock position after the handle is adjusted. In order to avoid this situation, it may be considered to further employ an interlock mechanism as in a conventional power tool. According to the conventional interlock mechanism, while the lock operation member is at the unlock position, the start operation member is prevented from being operated to the start position even when the user applies force to the start operation member. Nonetheless, when the lock operation member is returned to the lock position while the user applies force to the start operation member, the start operation member is operated immediately to the start position, causing the prime mover to unintentionally activate the tool.

In view of the problems described above, the power tool may be preferably provided with the following interlock mechanism. The interlock mechanism of the present teachings is configured to allow the start operation member to move from the stop position to the start position when the lock operation member is at the unlock position, and prevent the lock operation member from moving to the lock position when the start operation member is at the start position. Unlike the conventional interlock mechanism, the interlock mechanism of the present teachings allows the start operation member to move to the start position even when the lock operation member is at the unlock position. In other words, the start operation member is operable to the start position when the user applies force to the start operation member. On the other hand, the lock operation member is prevented from moving to the lock position when the start operation member is at the start position. Therefore, while the user operates the start operation member to the start position, the lock operation member is prevented from being operated to the lock position. By prohibiting the user from returning the lock operation member to the lock position, the user can realize that he/she intentionally operates the start operation member to the start position. After returning the start operation member to the stop position, the user can operate the lock operation member to the lock position, thereby preventing the tool from being activated unintentionally by the prime mover.

In one embodiment of the present teachings, the power tool may be a cordless electric tool having a motor as the prime mover and a battery for supplying electric power to the motor. In the cordless electric tool, the weight of the battery accounts for a large proportion of the entire weight of the tool. For this reason, the position of the center of gravity of the electric tool changes significantly, depending on the position of the battery, and the battery might feel extremely heavy when the user tilts the electric tool. Therefore, it is preferred that the battery is configured to attach to the second unit. According to this configuration, the position or direction of the battery with respect to the tool can be adjusted by rotating the second unit with respect to the first unit. The user might feel the heavy weight of the battery by adjusting the position or direction of the battery, even when the user tilts the electric tool.

In one embodiment of the present teachings, the power tool may be a hedge trimmer having a pair of shear blades for trimming a hedge. The hedge trimmer is used in various postures (orientations) by the user in trimming the hedge. When trimming, e.g. an upper surface of the hedge, the user uses the hedge trimmer in its normal posture. When trimming, e.g. a side surface of the hedge, the user tilts the hedge trimmer to a side. In this case, the user can handle the hedge trimmer comfortably by rotating the second unit with respect to the first unit.

DETAILED DESCRIPTION OF INVENTION

In one embodiment of the present teachings, an interlock mechanism may be configured to prevent a lock operation member from moving to an unlock position when a start operation member is at a start position. This configuration can prevent the lock between a first unit and a second unit from being released when a tool is activated by a prime mover.

In one embodiment of the present teachings, the first unit may be provided with a second handle configured to be gripped by a user and the second handle may be provided with a second start operation member configured to be operated by the user between a start position and a stop position. In this case, a supply circuit may be provided with a second start cooperative switch configured to operate interconnectedly with the second start operation member. The second start cooperative switch is preferably configured to enable the supply circuit when the second start operation member is at the start position, and cut off the supply circuit when the second start operation member is at the stop position. According to this configuration, the activation of the tool is prevented, as long as the two start operation members are not operated.

In the embodiment described above, it is preferred that the handle may be provided in an upper portion of the second unit and that the battery may be disposed at a lower portion of the second unit. According to this configuration, the posture of the second unit is stabilized by the weight of the battery, when the user grips the handle. As a result, the posture of the electric tool also is stabilized, allowing the user to handle the electric tool easily.

In one embodiment of the present teachings, the first unit may be located in front of the second unit and that the tool extend frontward from the first unit. According to this configuration, weight of a hedge trimmer can be distributed well by disposing a relatively heavy battery at a rear portion of a main body with respect to the tool extending frontward from the main body.

In one embodiment of the present teachings, the second unit may be configured to rotate uniaxially with respect to the first unit. Alternatively, in another embodiment, the first unit and the second unit may be coupled to each other by a universal joint to allow the second unit to be able to rotate multiaxially with respect to the first unit. The second unit may be configured to rotate 360 degrees or more, or rotate (or swung) within an angular range of less than 360 degrees.

Embodiment

Figure 1:
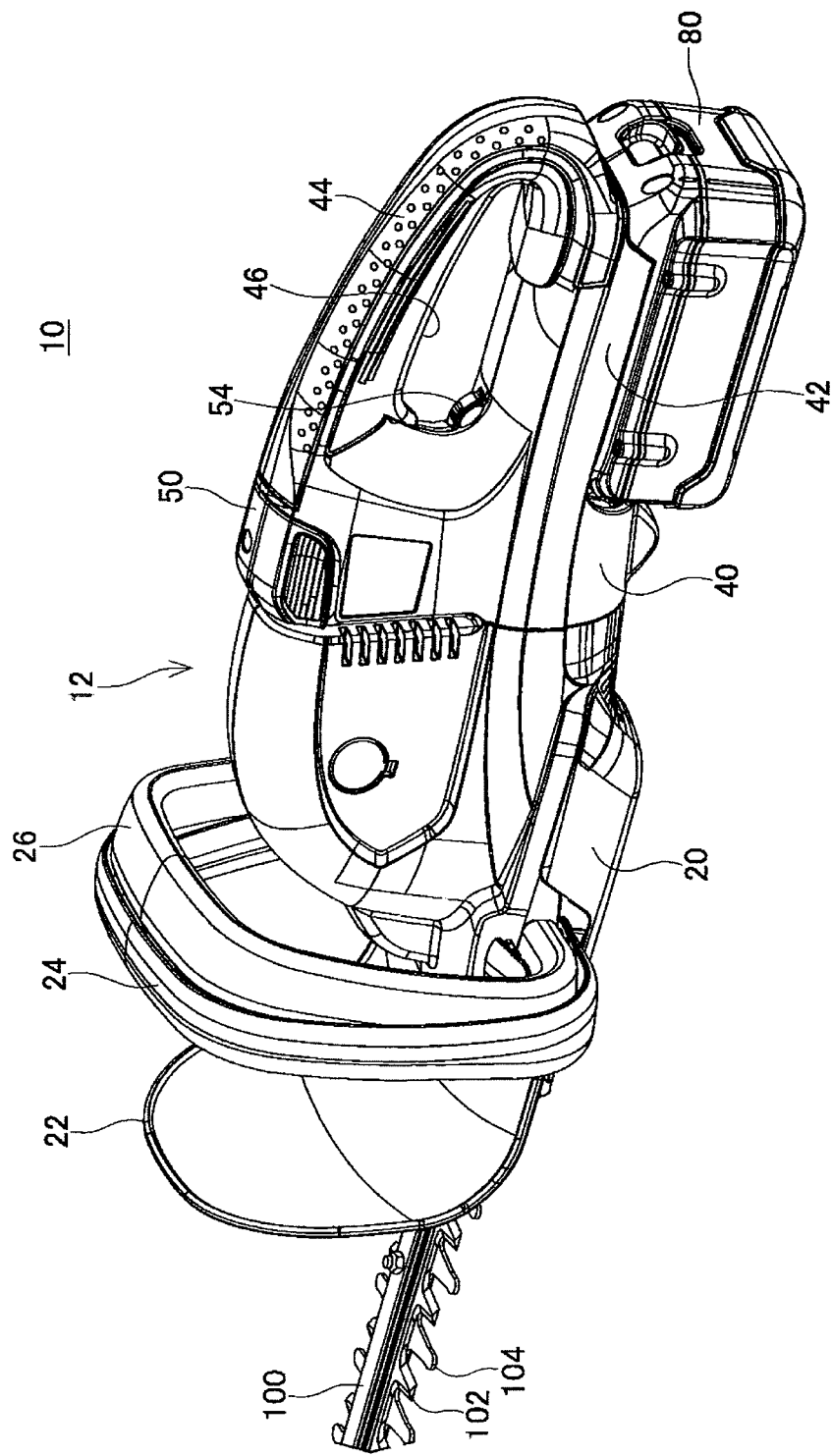
FIG. 1 shows an appearance of a hedge trimmer.
Figure 2:
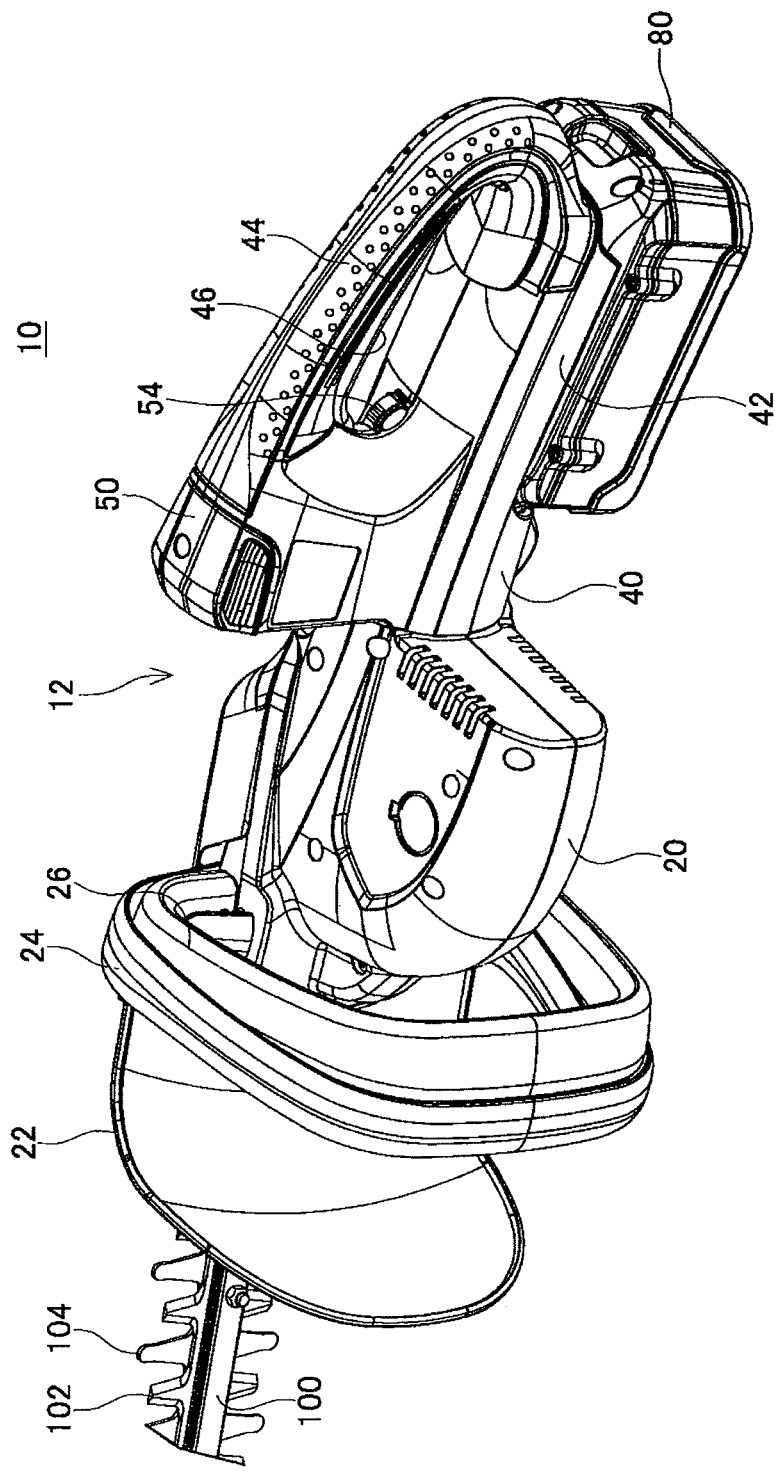
FIG. 2 shows the appearance of the hedge trimmer in a state in which a second unit is rotated with respect to a first unit.

A hedge trimmer 10 used for implementing the present teachings is described with reference to the drawings. The hedge trimmer 10 is a gardening power tool used for trimming a hedge and the like. As shown in FIGS. 1 and 2, the hedge trimmer 10 is provided with a main body 12 and a blade assembly 100 attached to the main body 12. A rechargeable battery pack 80 is attached to the main body 12. The hedge trimmer 10 is an electric tool having the battery pack 80 as a power source.

The blade assembly 100 includes an upper shear blade 102 and a lower shear blade 104. Although not shown partially, the pair of shear blades 102, 104 extends frontward from the main body 12. A plurality of comb-like blade portions is formed on the pair of shear blades 102, 104. The pair of shear blades 102, 104 can cut leaves and branches of the hedge by reciprocating relative to each other. The structure of the pair of shear blades 102, 104 is well known; thus, the detailed description thereof is omitted.

The main body 12 is provided with a first unit 20 and a second unit 40. The second unit 40 is configured to be rotatable with respect to the first unit 20. As will be described in detail, in the hedge trimmer 10 the angle of the second unit 40 with respect to the first unit 20 (or, conversely, the angle of the first unit 20 with respect to the second unit 40) can be adjusted in multiple stages.

The blade assembly 100 is attached to the first unit 20. The blade assembly 100 extends frontward from the first unit 20. The first unit 20 is provided with a chip guard 22 for inhibiting cut pieces from scattering, and a front handle 24 gripped by a user. The front handle 24 extends in the form of a loop in a plane substantially perpendicular to a front-back direction (i.e., a longitudinal direction of the blade assembly 100). The front handle 24 is provided with a front start lever 26. The front start lever 26 is an operation member that is operated by the user in order to activate the blade assembly 100. The front start lever 26 is supported swingably and operated by the user between a stop position and a start position. The front start lever 26 is biased toward the stop position and kept at the stop position, unless the user applies operating force thereto.

The second unit 40 is located behind the first unit 20. An axis of rotation of the second unit 40 with respect to the first unit 20 extends roughly in the front-back direction but is provided with a small angle with respect to the longitudinal direction of the blade assembly 100. The second unit 40 is provided with a battery attachment portion 42 to/from which the battery pack 80 can be attached/detached, and a main handle 44 gripped by the user. The battery attachment portion 42 is provided in a lower portion of the second unit 40, whereas the main handle 44 is provided in an upper portion of the second unit 40. The main handle 44 is provided with a main start lever 46. The main start lever 46 is an operation member that is operated by the user in order to activate the blade assembly 100. In other words, the user can start the pair of shear blades 102, 104 by operating both the main start lever 46 and the front start lever 26. The main start lever 46 is supported swingably and operated by the user between a stop position and a start position. The main start lever 46 is biased toward the stop position and kept at the stop position, unless the user applies operating force thereto.

The second unit 40 is further provided with a lock operation member 50. The lock operation member 50 is an operation member that is operated by the user in order to rotate the second unit 40 with respect to the first unit 20. The lock operation member 50 is supported in a manner as to be able to advance or retreat and operated by the user between a lock position and an unlock position. The lock operation member 50 is biased toward the lock position is kept at the lock position, unless the user applies operating force thereto. More specifically, when the user pulls the lock operation member 50, the lock operation member 50 moves to the unlock position, and when the user releases his/her hand from the lock operation member 50, the lock operation member 50 moves to the lock position.

The second unit 40 is also provided with a speed adjustment dial 54. The speed adjustment dial 54 is an operation member operated by the user and supported rotatably. When the user rotates the speed adjustment dial 54, the working speed of the pair of shear blades 102, 104 changes. In other words, the user can adjust the working speed of the pair of shear blades 102, 104 (i.e., the rotating speed of a motor 30) by adjusting the rotation of the speed adjustment dial 54. At this moment, the speed adjustment dial 54 is disposed on the inside of the main handle 44 that is formed in the shape of a loop, and is surrounded by the main handle 44. Therefore, the speed adjustment dial 54 is protected by the main handle 44 or a hand of the user gripping the main handle 44, so that, for example, an external matter such as a branch of a hedge can be prevented from coming into contact with the speed adjustment dial 54. Furthermore, the speed adjustment dial 54 can be protected from being damaged when the hedge trimmer 10 is, for example, dropped.

Figure 3:
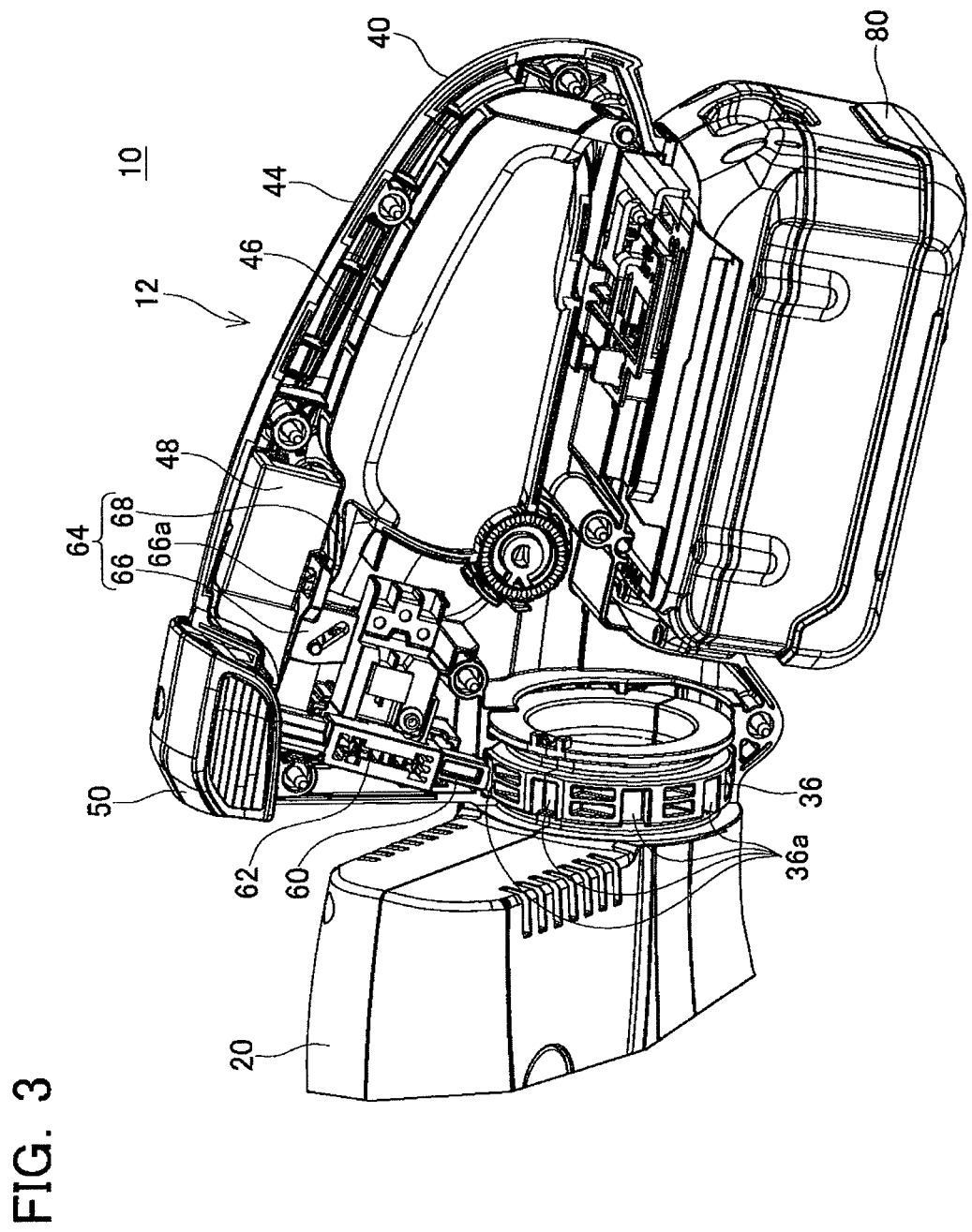
FIG. 3 shows a state in which the first unit of a main body is opened (when a main start lever and lock operation member are operated).

FIG. 3 shows a state in which the second unit 40 of the main body 12 is opened. As shown in FIG. 3, the first unit 20 is provided with a cylindrical rotating shaft portion 36, and the second unit 40 holds the rotating shaft portion 36 rotatably. Thus, the first unit 20 and the second unit 40 can rotate around the rotating shaft portion 36. A plurality of lock holes 36a is formed on an outer circumferential surface of the rotating shaft portion 36. The plurality of lock holes 36a is arranged at an equal interval along a circumferential direction of the rotating shaft portion 36. The second unit 40, on the other hand, is provided with a lock pin 60 configured to be engaged with the lock holes 36a. The lock pin 60 is supported so as to be able to slide with respect to the rotating shaft portion 36. The lock pin 60 is fixed to the lock operation member 50 and moves along with the lock operation member 50. The lock pin 60 and the lock operation member 50 are biased toward the rotating shaft portion 36 by a spring member 62.

When the lock operation member 50 is at the lock position, the lock pin 60 is inserted into one of the lock holes 36a of the rotating shaft portion 36. As a result, the second unit 40 is locked with respect to the first unit 20, preventing the second unit 40 from rotating with respect to the first unit 20. However, when the lock operation member 50 is moved to the unlock position, the lock pin 60 separates from the lock hole 36a of the rotating shaft portion 36. As a result, the lock between the first unit 20 and the second unit 40 is released, allowing the second unit 40 to rotate with respect to the first unit 20. In other words, the angle of the second unit 40 with respect to the first unit 20 can be adjusted, by pulling the lock operation member 50 to the unlock position, and the adjusted angle of the second unit 40 with respect to the first unit 20 can be maintained, by returning the lock operation member 50 to the lock position. The angle of the second unit 40 with respect to the first unit 20 can be adjusted in a stepwise manner according to an angular space between two lock holes 36a.

The user normally grips the main handle 44 with his/her right hand and grips the front handle 24 with his/her left hand, to hold the hedge trimmer 10. The user activates the pair of shear blades 102, 104 of the blade assembly 100 by operating the main start lever 46 with the right hand and the front start lever 26 with the left hand. The user then clips leaves and branches of the hedge by moving the blade assembly 100 along a surface of the hedge. In so doing, the user needs to change the direction of the blade assembly 100 such that the blade surfaces of the blade assembly 100 (precisely, the pair of shear blades 102, 104) become substantially parallel to the surface of the hedge. For instance, when trimming an upper surface of the hedge that is almost horizontal, the blade surfaces of the blade assembly 100 need to be substantially horizontal. When trimming a side surface of the hedge that is almost vertical, the blade surfaces of the blade assembly 100 need to be substantially vertical.

As shown in FIGS. 1 and 2, in the hedge trimmer 10 the direction of the blade assembly 100 can be changed by rotating the first unit 20 with respect to the second unit 40. Therefore, when trimming the upper surface of the hedge, for example, the direction of the blade assembly 100 is adjusted to the one shown in FIG. 1. When trimming the side surface of the hedge, the direction of the blade assembly 100 is adjusted to the one shown in FIG. 2. As is clear from a comparison between FIG. 1 and FIG. 2, the direction of the blade assembly 100 can be adjusted to be horizontal (FIG. 1) or vertical (FIG. 2), without practically changing the direction of the second unit 40. The second unit 40 is provided with the relatively heavy battery pack 80. Because the position of the battery pack 80 does not change even when the direction of the blade assembly 100 is changed, the user can handle the hedge trimmer 10 comfortably, without feeling the weight of the battery pack 80 much.

Especially in the hedge trimmer 10 of the present embodiment, the battery pack 80 is attached to the lower portion of the second unit 40, and the main handle 44 is provided in the upper portion of the second unit 40. According to this structure, the posture of the second unit 40 is stabilized by the weight of the battery pack 80, when the user grips the main handle 44. As a result, the posture of the hedge trimmer 10 also is stabilized, allowing the user to handle the hedge trimmer 10 comfortably.

Moreover, in the hedge trimmer 10 of the present embodiment, the blade assembly 100 extends long frontward from the first unit 20, and the relatively heavy battery pack 80 is attached to the second unit 40 located behind the first unit 20. According to this configuration, the weight of the blade assembly 100 that extends long frontward and the relatively large weight of the battery pack 80 are balanced with each other. Therefore, the position of the center of gravity of the hedge trimmer 10 is inhibited from leaning to one side in the front-back direction.

Figure 4:
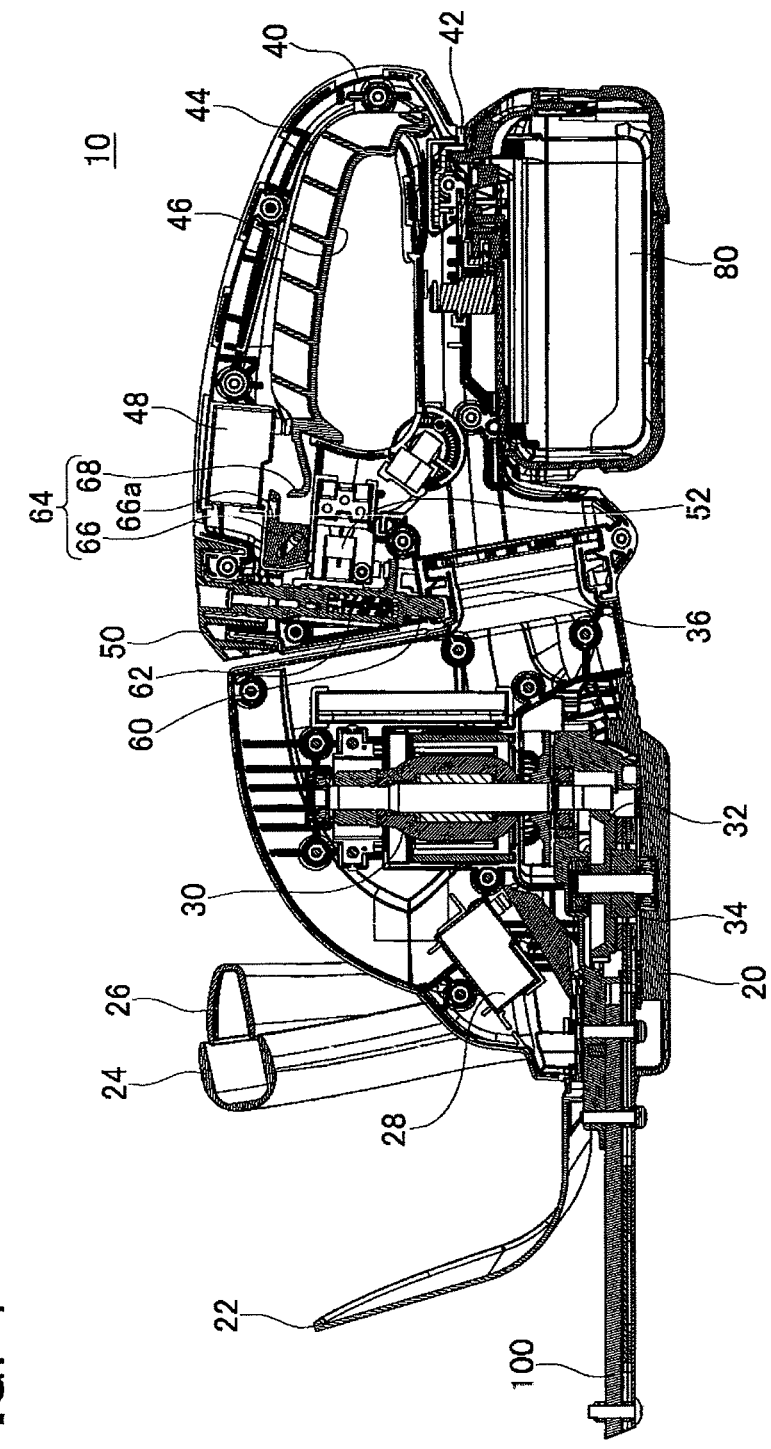
FIG. 4 is a cross-sectional diagram showing an internal structure of the main body (during a stop).
Figure 5:
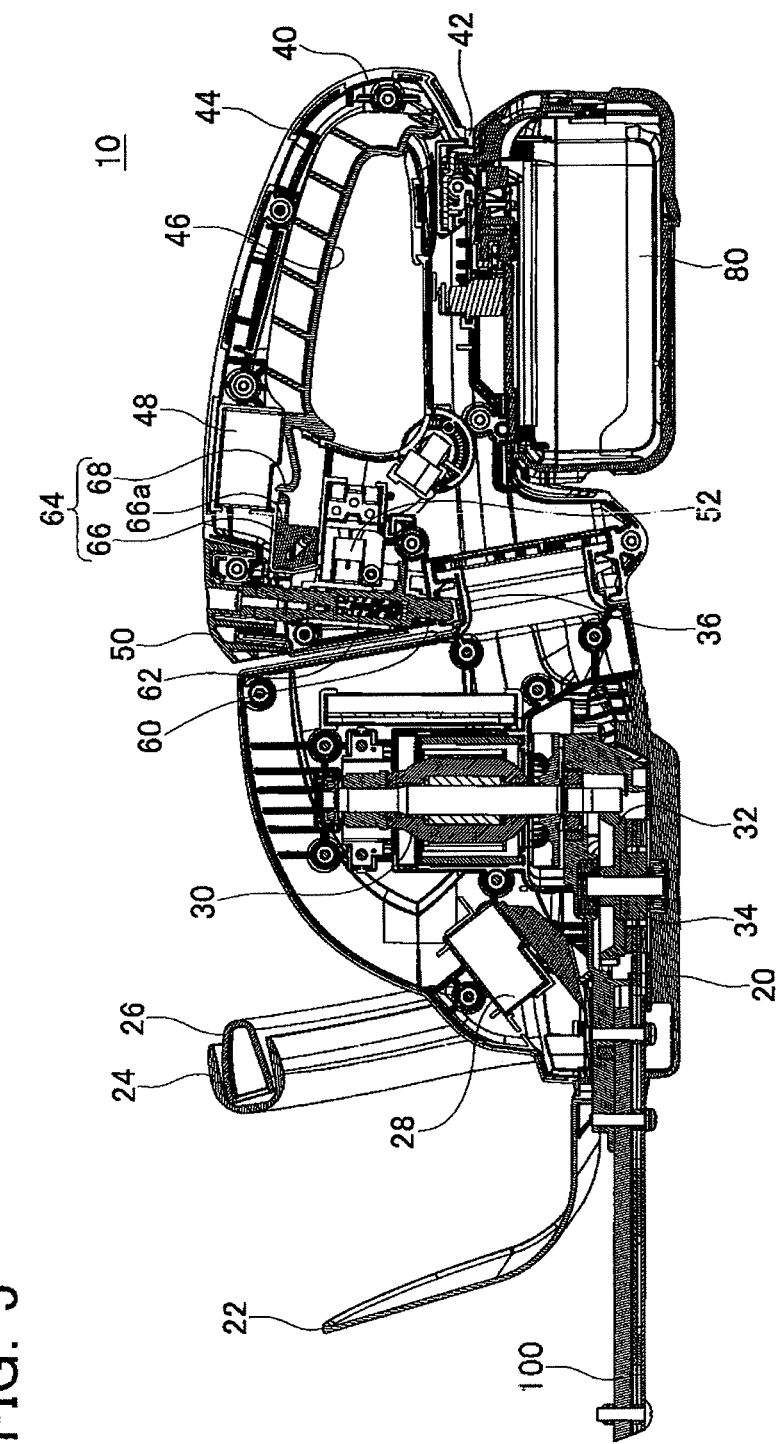
FIG. 5 is a cross-sectional diagram showing the internal structure of the main body (upon starting).
Figure 6:
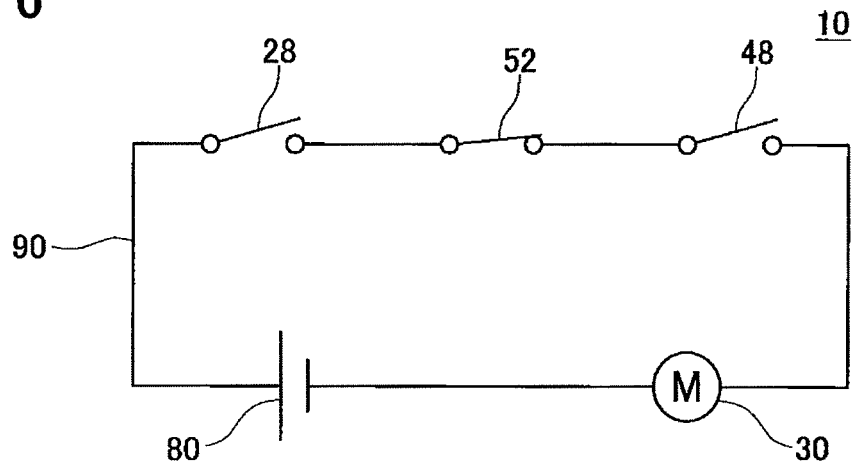
FIG. 6 is a circuit diagram showing an electrical configuration of the hedge trimmer (during a stop).
Figure 7:
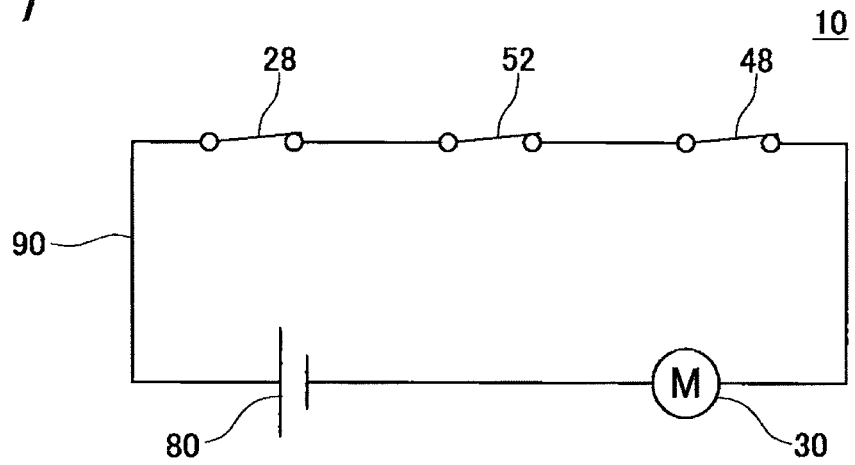
FIG. 7 is a circuit diagram showing the electrical configuration of the hedge trimmer (upon starting).

Next, an internal structure of the hedge trimmer 10 is described. FIGS. 4 and 5 are each a cross-sectional diagram showing the internal structure of the hedge trimmer 10. FIG. 4 shows a state in which the main start lever 46 is at the stop position, the front start lever 26 at the stop position, and the lock operation member 50 at the lock position. In other words, FIG. 4 shows a state in which the blade assembly 100 is not activated. FIG. 5, on the other hand, shows a state in which the main start lever 46 is at the start position, the front start lever 26 at the start position, and the lock operation member 50 at the lock position. In other words, FIG. 5 shows a state in which the blade assembly 100 is activated. Furthermore, FIGS. 6 and 7 are each a circuit diagram showing an electrical configuration of the hedge trimmer 10. FIG. 6 corresponds to FIG. 4, showing a state in which the blade assembly 100 is not activated. FIG. 7 corresponds to FIG. 5, showing a state in which the blade assembly 100 is activated. The circuit diagrams shown in FIGS. 6, 7, and 8 omit the portions associated with the speed adjustment dial 54.

As shown in FIGS. 4 and 5, the motor 30, a reduction gear 32 for amplifying a torque output by the motor 30, and a crank cam 34 for changing a rotary motion of the motor 30 to a reciprocating motion of the pair of shear blades 102, 104 are housed in the first unit 20. Furthermore, a front start cooperative switch 28 operating interconnectedly with the front start lever 26 is housed in the first unit 20. As shown in FIGS. 6 and 7, the motor 30 is coupled to the battery pack 80 by an electric power supply circuit 90 and rotates by receiving electric power from the battery pack 80. The front start cooperative switch 28 is provided on the electric power supply circuit 90 and capable of enabling/cutting off the electric power supply circuit 90. In other words, when the front start lever 26 is at the stop position, the front start cooperative switch 28 is turned off and cuts off the electric power supply circuit 90. When, on the other hand, the front start lever 26 is operated to the start position, the front start cooperative switch 28 is turned on and enables the electric power supply circuit 90.

As shown in FIGS. 3, 4, and 5, a main start cooperative switch 48 operating interconnectedly with the main start lever 46, and a lock cooperative switch 52 operating interconnectedly with the lock operation member 50 and the lock pin 60 are housed in the second unit 40. As shown in FIGS. 6 and 7, the main start cooperative switch 48 is provided on the electric power supply circuit 90 and capable of enabling/cutting off the electric power supply circuit 90. In other words, when the main start lever 46 is at the stop position, the main start cooperative switch 48 is turned off and cuts off the electric power supply circuit 90. When, on the other hand, when the main start lever 46 is operated to the start position, the main start cooperative switch 48 is turned on and enables the electric power supply circuit 90.

Figure 8:
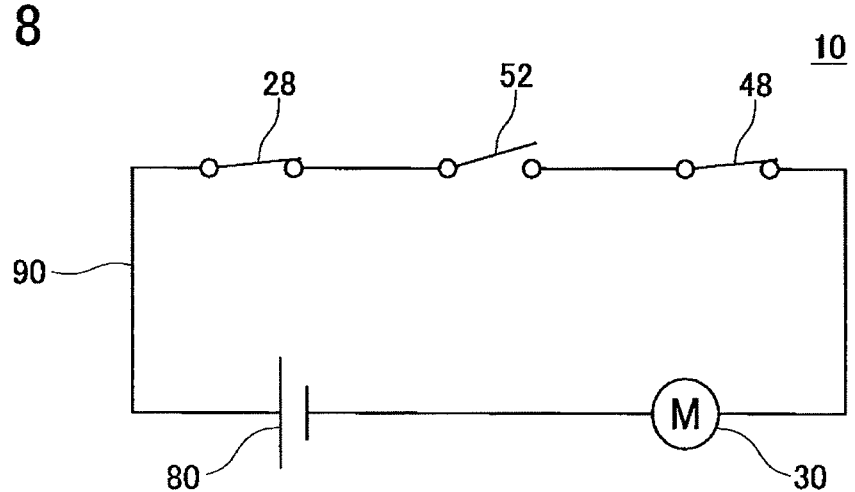
FIG. 8 is a circuit diagram showing the electrical configuration of the hedge trimmer (upon adjustment).

The lock cooperative switch 52, is similarly provided on the electric power supply circuit 90 and capable of enabling/cutting off the electric power supply circuit 90. However, the lock cooperative switch 52 is turned on and enables the electric power supply circuit 90 when the lock operation member 50 is at the lock position, and is turned off and cuts off the electric power supply circuit 90 when the lock operation member 50 is at the unlock position. Therefore, as shown in FIG. 8, once the lock operation member 50 is operated to the unlock position and consequently the lock cooperative switch 52 is turned off, the motor 30 is not activated even when the two start cooperative switches 28, 48 are turned on. In this manner, the hedge trimmer 10 is configured such that the activation of the motor 30 is electrically prevented in a state in which the lock between the first unit 20 and the second unit 40 is released.

The second unit 40 is further provided with an interlock mechanism 64 that mechanically curbs erroneous actuation of the motor 30. The interlock mechanism 64 is configured mainly by a slider 66 operating interconnectedly with the lock operation member 50 and a hook 68 operating interconnectedly with the main start lever 46. The interlock mechanism 64 can prevent the lock operation member 50 from moving to the unlock position when the main start lever 46 is at the start position. Therefore, when the blade assembly 100 is activated by the motor 30, the lock applied by the lock pin 60 is released, inhibiting the second unit 40 from rotating with respect to the first unit 20.

Additionally, the interlock mechanism 64 can prevent the lock operation member 50 from moving from the unlock position to the lock position when the main start lever 46 is at the start position, while allowing the main start lever 46 to move from the stop position to the start position when the lock operation member 50 is at the unlock position.

The interlock mechanism 64 of the present embodiment allows the main start lever 46 to move from the stop position to the start position even when the lock operation member 50 is at the unlock position. In other words, as long as the user applies operating force to the main start lever 46, the main start lever 46 is moved to the start position. Thereafter, when the main stat lever 46 is operated to the start position, the lock operation member 50 is prevented from moving from the unlock position to the lock position. Consequently, the lock operation member 50 is prevented from returning to the lock position, while the main start lever 46 remains operated to the start position. Therefore, the blade assembly 100 is inhibited from being activated by the motor 30. Note that when the lock operation member 50 is at the unlock position, the electric power supply circuit 90 is cut off by the lock cooperative switch 52 (see FIG. 8). For this reason, the motor 30 is not actuated regardless of the positions of the start levers 26, 46. By prohibiting the user from returning the lock operation member 50 to the lock position, the user can realize that he/she operates the main start lever 46 to the start position. After returning the main start lever 46 to the stop position, the lock operation member 50 can be operated to the lock position.

The interlock mechanism 64 is described hereinafter in detail with reference to FIGS. 3, 9, and 10. The slider 66 of the interlock mechanism 64 is coupled to the lock operation member 50 and configured to move in the front-back direction in response to a movement of the lock operation member 50 in a vertical direction. Specifically, when the lock operation member 50 moves upward toward the unlock position, the slider 66 moves rearward toward the main start lever 46. When the lock operation member 50 moves downward toward the lock position, the slider 66 moves frontward to separate from the main start lever 46. Moreover, an opening 66a extending in the vertical direction is formed in the slider 66. On the other hand, the hook 68 of the interlock mechanism 64 is formed integrally with the main start lever 46 and configured to move vertically in response to a swinging motion of the main start lever 46. Specifically, when the main start lever 46 moves upward toward the start position, the hook 68 also moves upward, and when the main start lever 46 moves downward toward the stop position, the hook 68 also moves downward.

Figure 9:
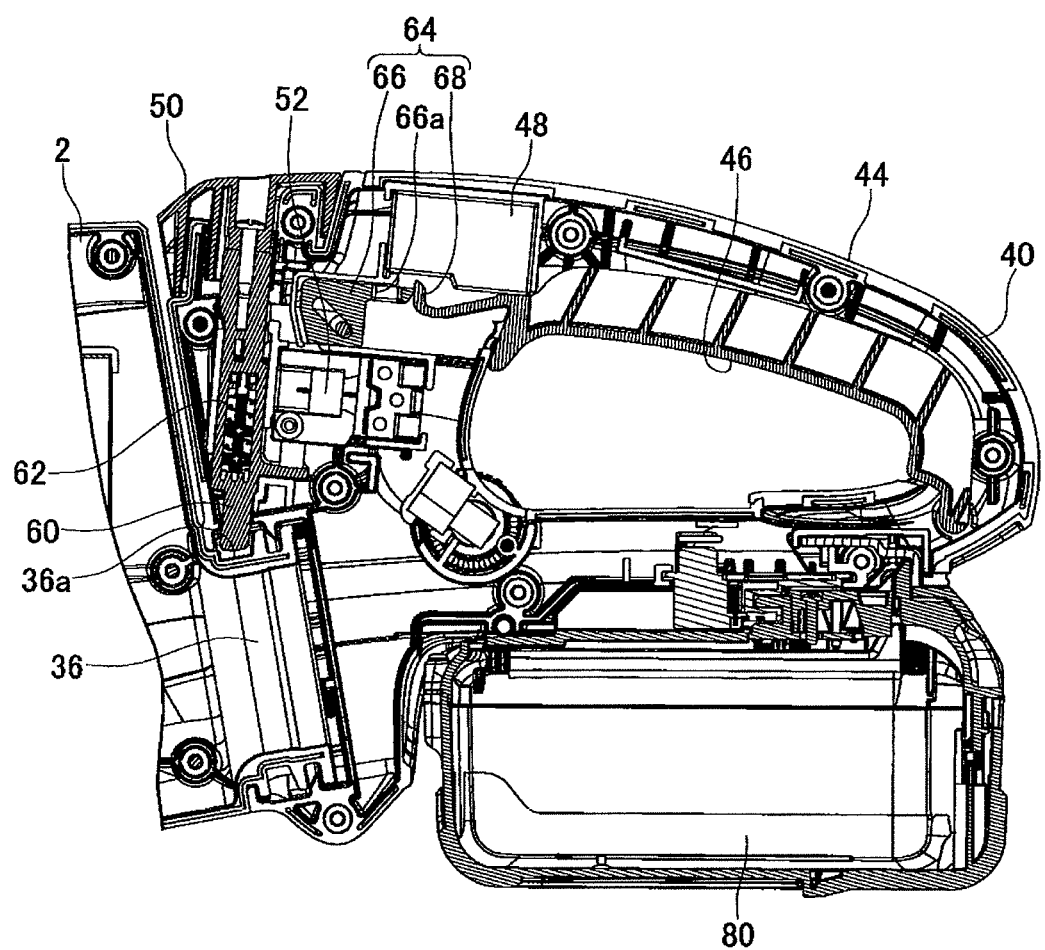
FIG. 9 is a diagram for illustrating operations of an interlock mechanism (when the main start lever is operated).

As shown in FIG. 9, when the main start lever 46 is operated to the start position, the hook 68 moves upward along with the main start lever 46. In this case, an outer surface of the hook 68 faces the rear side of the slider 66, and the slider 66 is prevented from moving rearward. As a result, the lock operation member 50 coupled to the slider 66 is prevented from moving upward toward the unlock position. Accordingly, the lock operation member 50 is prevented from being operated to the unlock position, while the main start lever 46 is operated to the start position.

Figure 10:
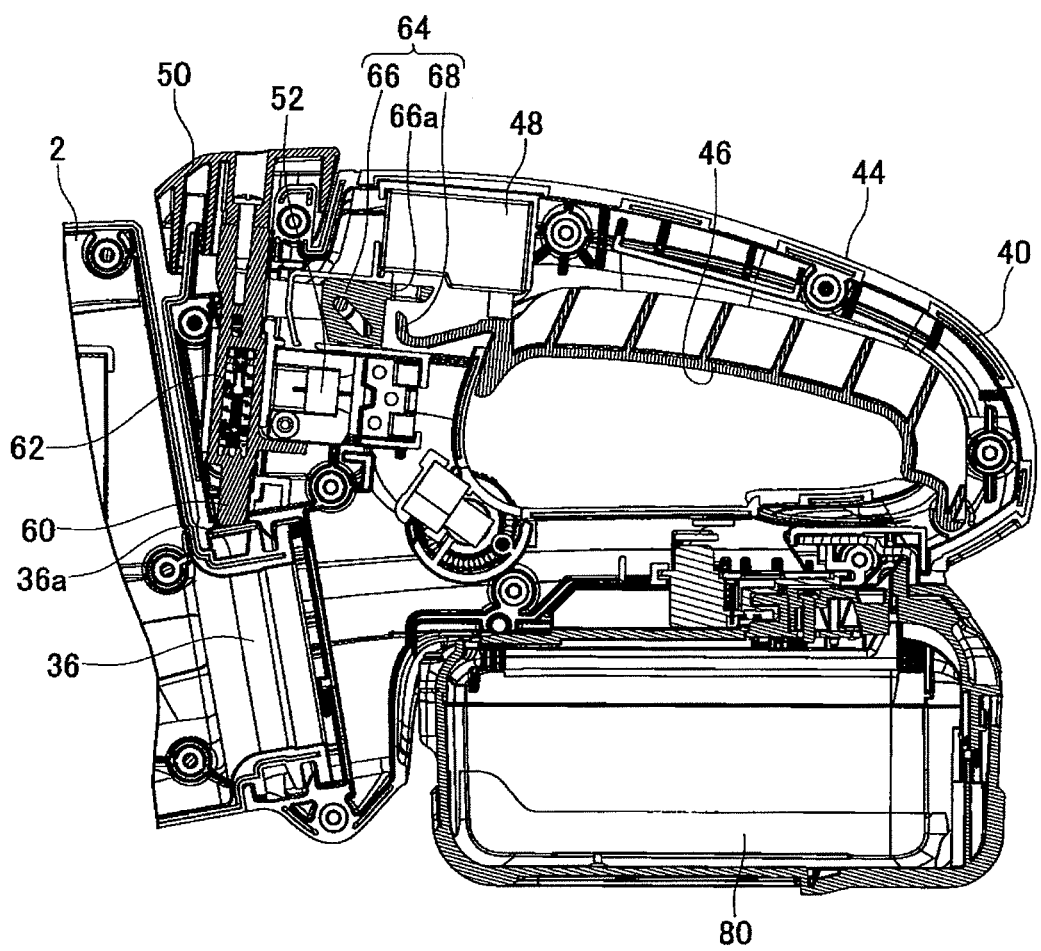
FIG. 10 is a diagram for illustrating the operations of the interlock mechanism (when the lock operation member is operated).

As shown in FIG. 10, on the other hand, when the main start lever 46 is at the stop position, the hook 68 is moved downward along with the main start lever 46. In this case, the slider 66 can move rearward without coming into contact with the hook 68. Therefore, the look operation member 50 is allowed to move upward toward the unlock position. The user can operate the lock operation member 50 to the unlock position and adjust the angle of the second unit 40 with respect to the first unit 20.

FIG. 3 shows a state in which the main start lever 46 is operated to the start position, while the lock operation member 50 is operated to the unlock position. In this case, the hook 68 moves upward to enter the opening 66a of the slider 66. The hook 68 is then hang on the slider 66, preventing the slider 66 from moving frontward. As a result, the lock operation member 50 coupled to the slider 66 is prevented from moving downward toward the lock position. Accordingly, the lock operation member 50 is prevented from being operated from the unlock position to the lock position, while the main start lever 46 is operated to the start position.

The interlock mechanism 64 described above is merely an example, and the structure thereof can be changed, if needed. For example, the slider 66 and the hook 68 may be operated interconnectedly with the main start lever 46 and the lock operation member 50, respectively. In addition, the combination of the slider 66 having the opening 66a and the hook 68 is a specific example of a pair of structures that can be engaged with each other, but another pair of structures that can be engaged with each other can be employed. The interlock mechanism 64 may be any mechanism as long as it enables engagement between the lock operation member 50 positioned at the unlock position and the main start lever 46 positioned at the start position (or the front start lever 26).

The embodiment described above is the hedge trimmer 10 for use in trimming a hedge, and particularly a cordless hedge trimmer 10 having a battery as a power source.

Japanese Patent Application Publication No. 2007-275063 discloses a conventional cordless hedge trimmer. This hedge trimmer is provided with a pair of shear blades, a main body for activating at least one of the shear blades using a motor, and a battery for supplying electric power to the motor.

In this cordless hedge trimmer, the weight of the battery accounts for a large proportion of the entire weight of the hedge trimmer. For this reason, the position of the center of gravity of the hedge trimmer changes significantly, depending on where the battery is disposed. Placing the battery at an inappropriate position disturbs the balance of the weight of the hedge trimmer, making it difficult for the user to handle the hedge trimmer.

The user moves the shear blades of the hedge trimmer along a surface of a hedge when trimming the hedge. In so doing, the posture (direction) of the hedge trimmer is changed depending on the direction of the surface of the hedge. When trimming, for example, an upper surface of the hedge, the user uses the hedge trimmer in its normal posture. When trimming a side surface of the hedge, the user tilts the hedge trimmer to a side.

The position of the battery with respect to the handle varies significantly, depending on the posture of the hedge trimmer, i.e., when the hedge trimmer is used in its normal posture and when the hedge trimmer is tilted to the side. When the battery is located vertically downward with respect to the handle, the battery might feel light. However, when the battery is located horizontally with respect to the handle, the battery might feel extremely heavy. It is inevitable that the battery feels heavy, as long as the hedge trimmer is used in various postures, regardless of the design of the positional relationship between the handle and the battery.

The present embodiment is to solve the problems described above and aims to provide teachings that allow the user to handle the hedge trimmer comfortably without feeling the heavy weight of the battery much.

In other words, the hedge trimmer 10 of the present embodiment is provided with the pair of shear blades 102, 104, the main body 12 for activating at least one of the shear blades 102, 104 using the motor 30, and the battery pack 80 for supplying electric power to the motor 30. The main body 12 is provided with the first unit 20 and the second unit 40 capable of rotating with respect to the first unit 20. The pair of shear blades 102, 104 is attached to the first unit 20, and the battery pack 80 is attached to the second unit 40.

Rotating the first unit 20 with respect to the second unit 40 can change the direction of the pair of shear blades 102, 104 while keeping the position of the battery pack 80. When changing the direction of the pair of shear blades 102, 104 in accordance with the surface of the hedge to be trimmed (e.g., the upper surface or side surface), the position of the battery pack 80 can be inhibited from being changed significantly. The user can handle the hedge trimmer 10 comfortably without feeling the weight of the battery pack 80 much.

The second unit 40 is provided with the handle 44 gripped by the user. According to this configuration, the positional relationship between the handle 44 and the battery pack 80 does not change, even when the second unit 40 is rotated with respect to the first unit 20. Thus, even when the position where the second unit rotates with respect to the first unit is changed in various ways, the user can handle the hedge trimmer comfortably without feeling the weight of the battery much.

In the hedge trimmer 10, the pair of shear blades 102, 104 extends frontward from the first unit 20, and the weight of the pair of shear blades 102, 104 leans to the front side of the hedge trimmer 10. On the other hand, the relatively heavy battery pack 80 is attached to the second unit 40 located behind the first unit 20, and the weight of the battery pack 80 leans frontward. This configuration can achieve a balance between the weight of the pair of shear blades 102, 104 and the weight of the battery pack 80 and appropriately distribute the weight of the hedge trimmer in the front-back direction.

A specific embodiment of the present teachings is described above, but that merely illustrates some possibilities of the teachings and does not restrict the claims thereof. The art set forth in the claims includes variations and modifications of the specific examples set forth above.

The present specification describes the hedge trimmer 10 as an embodiment. However, the present teachings disclosed in this specification may be applied to not only such type of power tools but also another type of power tools for outdoor work or even any other type of power tools.

The technical elements disclosed in the specification or the drawings may be utilized separately or in all types of combinations, and are not limited to the combinations set forth in the claims at the time of filing of the application. Furthermore, the art disclosed herein may be utilized to simultaneously achieve a plurality of aims or to achieve one of these aims.

The invention claimed is:

1. A power tool comprising:
a tool; and
a main body configured to activate the tool by using a prime mover;
wherein the main body comprises:
a first unit configured to attach the tool;
a second unit rotatably coupled with the first unit and provided with a handle to be gripped by a user;
a start operation member configured to be operated by the user between a start position and a stop position;
a start cooperative switch disposed on a supply circuit for supplying energy to the prime mover, and configured to enable the supply circuit when the start operation member is at the start position and cut off the supply circuit when the start operation member is at the stop position;
a lock operation member configured to be operated by the user between a lock position and an unlock position, and configured to prevent rotation of the second unit with respect to the first unit at the lock position and allow the rotation of the second unit with respect to the first unit at the unlock position;
a lock cooperative switch disposed on the supply circuit, and configured to enable the supply circuit when the lock operation member is at the lock position and cut off the supply circuit when the lock operation member is at the unlock position; and
an interlock mechanism configured to allow the start operation member to move to the start position even when the lock operation member is at the unlock position, and prevent the lock operation member from moving to the lock position when the start operation member is at the start position,
wherein the interlock mechanism is further configured to prevent the lock operation member from moving from the lock position to the unlock position when the start operation member is at the start position.

2. The power tool as in claim 1, wherein
the first unit is provided with a second handle configured to be gripped by the user,
the second handle is provided with a second start operation member configured to be operated by the user between a start position and a stop position, and
the supply circuit is provided with a second start cooperative switch configured to enable the supply circuit when the second start operation member is at the start position and cut off the supply circuit when the second start operation member is at the stop position.

3. The power tool as in claim 1, wherein
the prime mover is a motor, and
the second unit is configured to be attached to a battery that supplies electric power to the motor.

4. The power tool as in claim 3, wherein the handle is located at an upper portion of the second unit and the battery is located at a lower portion of the second unit.

5. The power tool as in claim 3, wherein the motor is housed within the first unit.

6. The power tool as in claim 3, wherein the first unit is located in front of the second unit, and the tool extends frontward from the first unit.

7. The power tool as in claim 1, wherein the power tool is a hedge trimmer and the tool is a pair of shear blades.

8. A hedge trimmer comprising:
a pair of shear blades;
a main body configured to activate the pair of shear blades by using a motor; and
a battery configured to supply electric power to the motor,
wherein the main body comprises a first unit, and a second unit that is rotatably coupled with the first unit,
the pair of shear blades is attached to the first unit,
the battery is attached to the second unit, and
the main body further comprises:
a start operation member configured to be operated by the user between a start position and a stop position;
a lock operation member configured to be operated by the user between a lock position and an unlock position, and configured to prevent rotation of the second unit with respect to the first unit at the lock position and allow the rotation of the second unit with respect to the first unit at the unlock position; and
an interlock mechanism configured to allow the start operation member to move to the start position even when the lock operation member is at the unlock position, and prevent the lock operation member from moving to the lock position when the start operation member is at the start position,
wherein the interlock mechanism is further configured to prevent the lock operation member from moving from the lock position to the unlock position when the start operation member is at the start position.

9. The hedge trimmer as in claim 8, wherein the second unit is provided with a handle configured to be gripped by the user.

10. The hedge trimmer as in claim 9, wherein the handle is located at an upper portion of the second unit and the battery is attached to a lower portion of the second unit.

11. The hedge trimmer as in claim 8, wherein the motor is housed within the first unit.

12. The hedge trimmer as in claim 8, wherein the first unit is located in front of the second unit, and the pair of shear blades extends frontward from the first unit.

13. The hedge trimmer as in claim 8, wherein the main body further comprises a start cooperative switch disposed on a supply circuit for supplying energy to the prime mover, and configured to enable the supply circuit when the start operation member is at the start position and cut off the supply circuit when the start operation member is at the stop position.

14. The hedge trimmer as in claim 8, wherein the main body further comprises a lock cooperative switch disposed on the supply circuit, and configured to enable the supply circuit when the lock operation member is at the lock position and cut off the supply circuit when the lock operation member is at the unlock position.

15. A power tool comprising:
a tool; and
a main body configured to activate the tool by using a prime mover;
wherein the main body comprises:
a first unit configured to attach the tool;
a second unit rotatably coupled with the first unit and provided with a handle to be gripped by a user;
a start operation member configured to be operated by the user between a start position and a stop position;
a lock operation member configured to be operated by the user between a lock position and an unlock position, and configured to prevent rotation of the second unit with respect to the first unit at the lock position and allow the rotation of the second unit with respect to the first unit at the unlock position; and
an interlock mechanism configured to prevent the lock operation member from moving from the lock position to the unlock position when the start operation member is at the start position;
wherein the interlock mechanism is further configured to allow the start operation member to move to the start position even when the lock operation member is at the unlock position, and prevent the lock operation member from moving to the lock position when the start operation member is at the start position.

16. The power tool as in claim 15, wherein the main body further comprises a start cooperative switch disposed on a supply circuit for supplying energy to the prime mover, and configured to enable the supply circuit when the start operation member is at the start position and cut off the supply circuit when the start operation member is at the stop position.

17. The power tool as in claim 15, wherein the main body further comprises a lock cooperative switch disposed on a supply circuit, and configured to enable the supply circuit when the lock operation member is at the lock position and cut off the supply circuit when the lock operation member is at the unlock position.

18. The power tool as in claim 16, wherein the main body further comprises a lock cooperative switch disposed on the supply circuit, and configured to enable the supply circuit when the lock operation member is at the lock position and cut off the supply circuit when the lock operation member is at the unlock position.

* * * * *